United States Patent
Kim et al.

(10) Patent No.: US 9,063,362 B2
(45) Date of Patent: Jun. 23, 2015

(54) DISPLAY APPARATUS

(75) Inventors: Taegyun Kim, Seoul (KR); Byunggun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 177 days.

(21) Appl. No.: 13/599,423

(22) Filed: Aug. 30, 2012

(65) Prior Publication Data

US 2013/0114018 A1    May 9, 2013

Related U.S. Application Data

(60) Provisional application No. 61/530,027, filed on Sep. 1, 2011.

(51) Int. Cl.
*G02F 1/1333* (2006.01)

(52) U.S. Cl.
CPC .......... *G02F 1/133308* (2013.01); *G02F 2001/133317* (2013.01); *G02F 2001/133322* (2013.01); *G02F 2201/465* (2013.01)

(58) Field of Classification Search
CPC .............. G02F 1/167; G02F 1/133308; G02F 1/133382

USPC ..................................................... 349/58–60
See application file for complete search history.

(56) References Cited

U.S. PATENT DOCUMENTS

| 6,064,453 A * | 5/2000 | Inubushi et al. ................. 349/58 |
| 6,894,739 B2 * | 5/2005 | Sung et al. ...................... 349/58 |

FOREIGN PATENT DOCUMENTS

| JP | 2004-013152 A | 1/2004 |
| JP | 2007-087656 A | 4/2007 |
| KR | 10-2002-0061978 A | 7/2002 |
| KR | 10-2007-0071742 A | 7/2007 |

OTHER PUBLICATIONS

International Search Report dated Mar. 21, 2013 issued in Application No. PCT/KR2012/007011.

\* cited by examiner

*Primary Examiner* — Dung Nguyen
(74) *Attorney, Agent, or Firm* — KED & Associates LLP (57) ABSTRACT

Disclosed is a display apparatus including a liquid crystal display (LCD) panel, a front cover including first latches and second latches, a back cover coupled with the first latches, and a guide panel, on which the LCD panel is seated. The guide panel is coupled with the second latches.

15 Claims, 11 Drawing Sheets

DISPLAY APPARATUS

CROSS-REFERENCE TO RELATED APPLICATION

This application claims the priority benefit of US Provisional Patent Application No. 61/530,027, filed on Sep. 1, 2011, in the USPTO, the disclosure of which is incorporated herein by reference.

BACKGROUND OF THE INVENTION

1. Field of the invention

The present invention relates to a display apparatus.

2. Description of the Related Art

The recent expansion of information society has promoted development of various display devices such as a liquid crystal display (LCD), a plasma display panel (PDP), and an organic light emitting diode (OLED). In particular, the LCD uses a liquid crystal display panel including a liquid crystal layer, and a thin film transistor (TFT) substrate and a color filter substrate, which oppose each other under the condition that the liquid crystal layer is interposed between the TFT substrate and the color filter substrate. The liquid crystal display panel can display an image, using light supplied from a backlight unit.

SUMMARY OF THE INVENTION

Therefore, the present invention has been made in view of the above problems, and it is an object of the present invention to provide a display apparatus having an enhanced appearance through a reduced thickness and a reduced bezel.

Another object of the present invention is to provide a display apparatus capable of achieving an improvement in manufacturing process and a reduction in manufacturing costs.

In accordance with an aspect of the present invention, the above and other objects can be accomplished by the provision of a display apparatus including a liquid crystal display (LCD) panel, a front cover including first latches and second latches, a back cover coupled with the first latches, and a guide panel, on which the LCD panel is seated, the guide panel being coupled with the second latches.

In accordance with another aspect of the present invention, there is provided a display apparatus including a liquid crystal display (LCD) panel, a front cover forming a front outer periphery of the LCD panel, a guide panel, on which the LCD panel is seated, the guide panel being coupled to the front cover, and a back cover coupled to the front cover.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Exemplary embodiments of the present invention will be described with reference to the attached drawings.

Figure 1A:
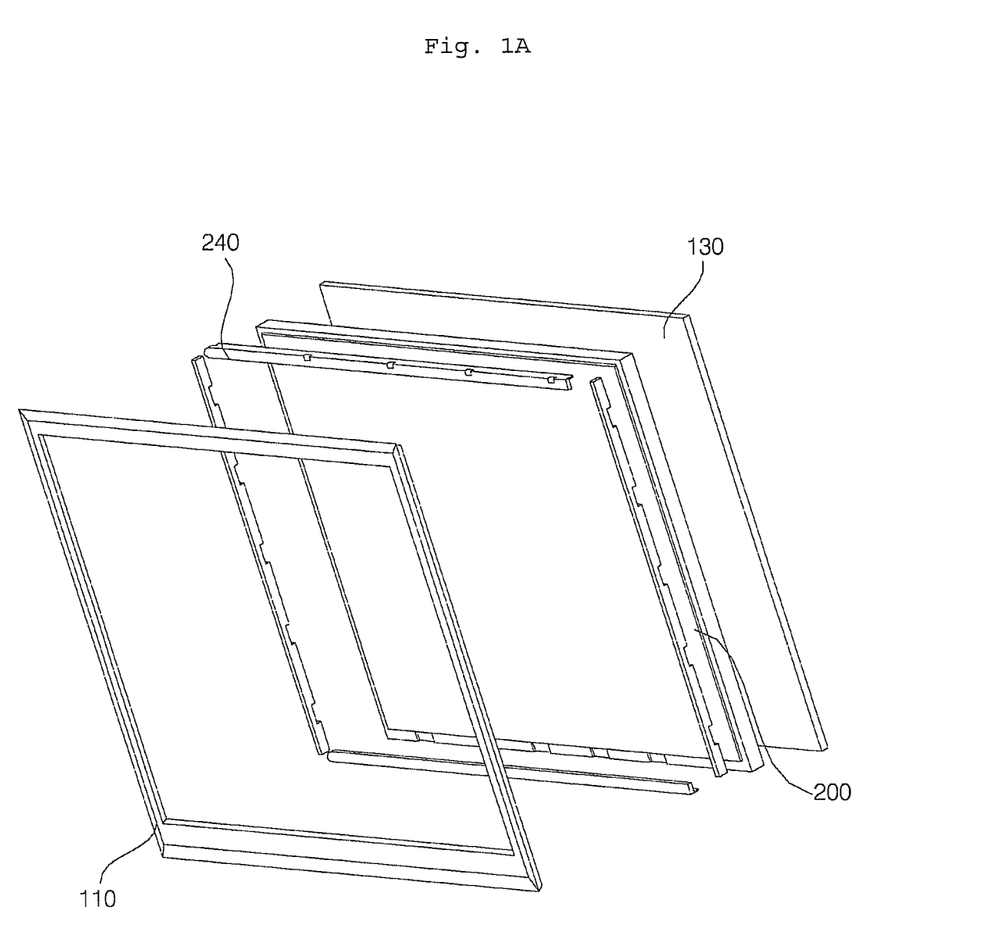
FIGS. 1A and 1B are exploded perspective view illustrating an example of a display apparatus.
Figure 1B:
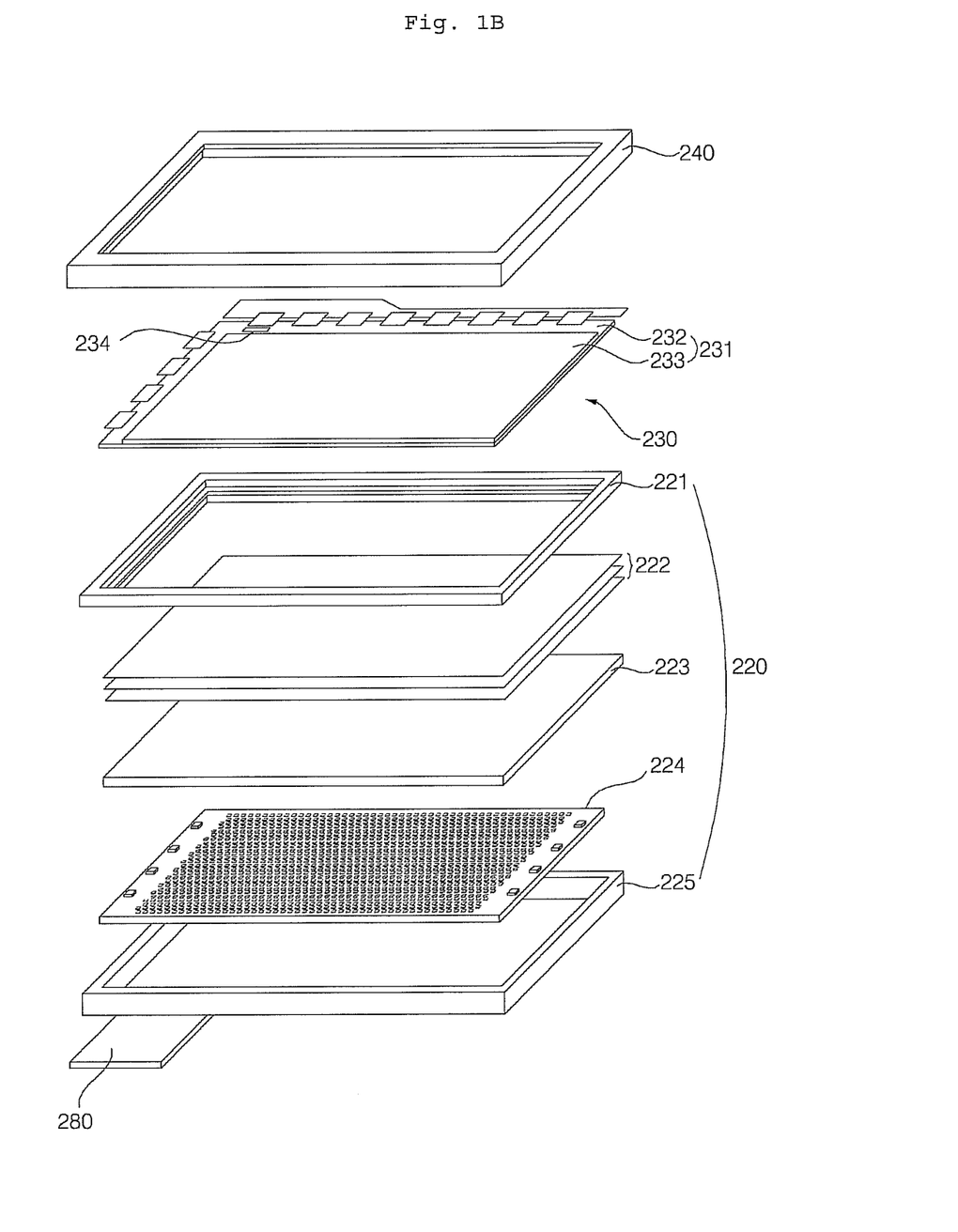
Figure 2:
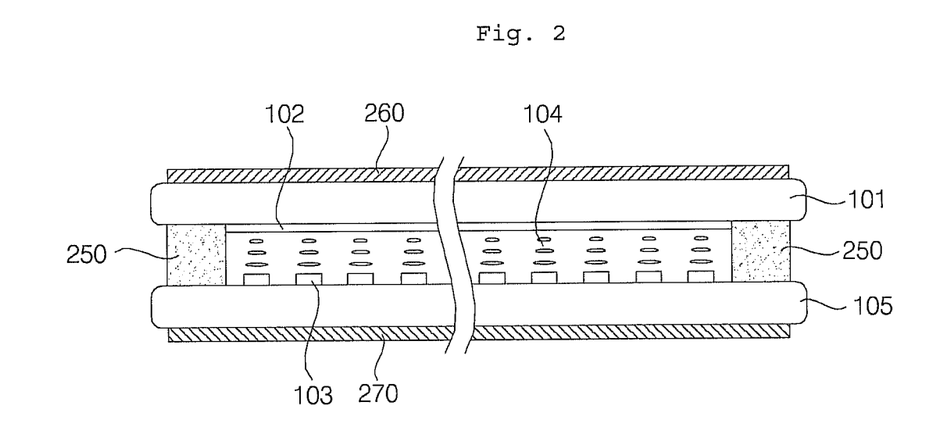
FIGS. 2 and 3 are views for explaining a configuration of the display apparatus.
Figure 3:
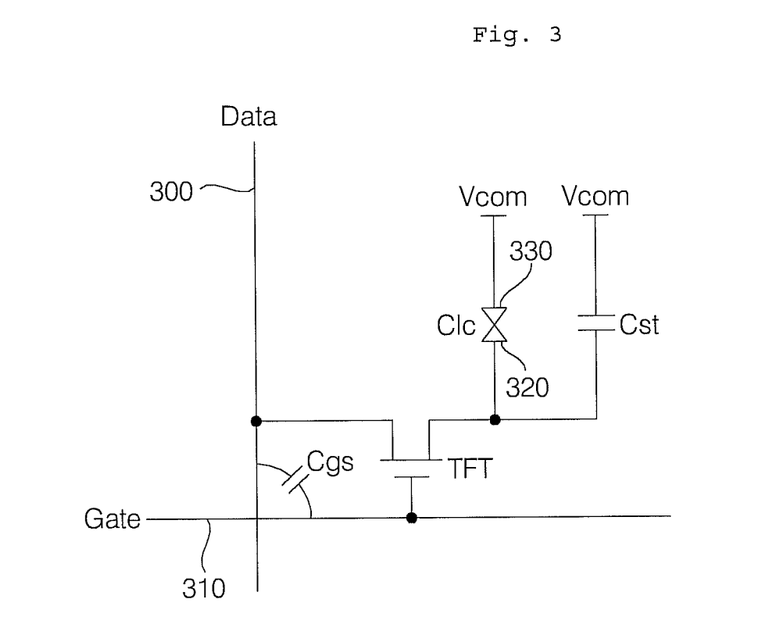

Although a suffix "module" or "unit" is used for constituent elements described in the following description, it is used only for convenient description of the specification. The suffixes "module" and "unit" may be interchangeably used FIGS. 1A and 1B are exploded perspective views illustrating an example of a display apparatus. FIGS. 2 and 3 are views for explaining a configuration of the display apparatus.

Referring to FIGS. 1A and 1B, the display device may include a front cover 110 and a back cover 130, which define an appearance of the display device.

A liquid crystal display (LCD) module 200 may be received in a space defined between the front cover 110 and the back cover 130.

Meanwhile, the terms "front side", "front surface", "rear side" and "rear surface" used in the specification are based on the front cover 110 of the display device. That is, the direction toward the front cover 110 is referred to as "front side", and the surface of each member directed to the front cover 110 is referred to as "front surface". Also, the direction toward the back cover 130 is referred to as "rear side", and the surface of each member directed to the back cover 130 is referred to as "rear surface".

Referring to FIGS. 1A and 1B, the LCD module 200 includes an LCD panel 230 to display an image, and a backlight unit 220 including a plurality of light sources. The LCD module 200 may also include frames to support the LCD panel 230 and backlight unit 220.

FIG. 1B, which simply shows an example of an LCD module including a backlight unit, is not intended to limit the structure of the present invention. It will be appreciated that the LCD module and display apparatus may be configured to have various structures other than the structures illustrated in the drawings.

Referring to FIG. 1B, the LCD panel 230 includes front and rear substrates, namely, a thin film transistor (TFT) substrate 232 and a common electrode substrate 233, and a liquid crystal layer (not shown) interposed between the two substrates 232 and 233. The LCD panel 230 may also include various tape carrier packages (TCPs), printed circuit boards (PCBs), etc.

The LCD panel 230 will be described later with reference to FIG. 2.

The LCD module 200 also includes a case top 240, which defines an appearance of the LCD module 200. A space to receive the LCD panel 230 is formed in the case top 240. The case top 240 is centrally opened to outwardly expose the LCD panel 230.

The case top 240 is coupled with a cover bottom 225 included in the backlight unit 220 under the condition that a guide panel 221 also included in the backlight unit 220 is interposed between the case type 240 and the case bottom 225. In addition to the guide panel 221 and cover bottom 225, the backlight unit 220 includes an optical sheet 222, a diffusion plate 223, a reflection sheet (not shown), and a light source unit 224.

Light sources of various types such as a cold cathode fluorescent lamp (CCFL) and a light emitting diode (LED) may be applied to the present invention. For example, the light source, which is applied to the present invention, may be an LED chip or an LED package including at least one LED chip. In this case, the light source may be constituted by a color LED to emit at least one of red, blue, green, etc. or a white LED.

The light source unit 224 is constituted by a plurality of LEDs. The light source unit 224 supplies light to the LCD panel 230. In the illustrated case, the backlight unit 120 is of a direct type. Of course, the backlight unit 120 may be of an edge type in accordance with the present invention. A back cover 130 may be arranged at the rear of the backlight unit 120.

The guide panel 221 receives therein the optical sheet 222, the diffusion plate 23, the reflection sheet (not shown) and the light source unit 224, which includes a plurality of LEDs. The guide panel 221 is fixed to the cover bottom 225 in a seated state. The guide panel 221 is centrally opened to allow transmission of light sequentially passing through the diffusion plate 223 and optical sheet 222. The guide panel 221 has side walls forming respective edges of a rectangular structure.

The optical sheet 222 functions to condense diffused light received from the diffusion plate 223. The optical sheet 222 includes a prism sheet, a protection sheet, etc.

The prism sheet refracts light emerging from the diffusion plate 223 such that light incident at a small incidence angle is forwardly concentrated, to enhance the brightness of the display apparatus within an effective viewing angle range.

The protection sheet formed over the prism sheet not only functions to protect the surface of the prism sheet, but also to diffuse light such that the light is uniformly distributed.

The configuration of the optical sheet 222 may be varied in accordance with the specifications of the display apparatus without being limited to the above-described configuration. For example, an optical sheet, which is of a type different from the above-described type, may be used. Also, the optical sheet may have various arrangements. For example, the optical sheet may have an arrangement in which the diffusion sheet, prism sheet, and protection sheet are laminated in this order.

The diffusion plate 223 functions to diffuse light emitted from the light sources, namely, the LEDs, in all directions. The diffusion plate 223 prevents hot spots exhibited due to locally-bright portions around LEDs, which are point light sources, from being viewed at the front surface of the display module.

The reflection sheet (not shown) reflects light, which is downwardly directed after being reflected by the diffusion plate 223, etc., toward the LCD panel 230, to enhance luminous efficiency. The reflection sheet (not shown) may be formed with holes, through which respective LEDs are exposed.

Thus, the LEDs are exposed through the holes of the reflection sheet (not shown) and, as such, the LEDs upwardly emit light. Light downwardly directed after being reflected by the diffusion plate 223, etc. is upwardly reflected by the reflection sheet (not shown).

The LCD module 200 may also include various circuits 280. Each circuit 280 performs conversion of a voltage supplied from an external voltage source, to generate a drive voltage and a drive signal, which will be applied to each light source. The circuits 280 are disposed at the rear surface of the cover bottom 225, and is then covered by a cover (not shown), to be isolated from an outside such that they can be protected from external impact or the like.

Meanwhile, as shown in FIG. 2, the LCD panel 230 may include a front substrate 101 and a rear substrate 105 assembled such that they face each other to define a uniform cell gap therebetween. A liquid crystal layer 104 may be formed between the front substrate 101 and the rear substrate 111.

Also, a seal portion 250 may be interposed between the front substrate 101 and the rear substrate 111, to seal the liquid crystal layer 104.

A color filter 102 to render red (R), green (G) and blue (B) may be disposed on the front substrate 101. The color filter 102 includes a plurality of pixels each including R, G and B sub-pixels. Upon receiving light, each pixel may generate an image corresponding to R, G or B. Although each pixel includes R, G and B sub-pixels, as described above, the present invention is not limited to such a sub-pixel arrangement. For example, each pixel may include, R, G, B and white (W) sub-pixels. In addition, each pixel may include various sub-pixel combinations.

Transistors 103, for example, thin film transistors (TFTs), may be formed on the rear substrate 111, to turn on/off liquid crystals for respective pixels.

Thus, the front substrate 101 may also be referred to as a "color filter substrate 101", and the rear substrate 105 may also be referred to as a "TFT substrate 105".

A front polarization film 260 may be disposed at the front surface of the front substrate 101, to polarize light emerging from the LCD panel 230. Also, a rear polarization film 270 may be disposed at the rear surface of the rear surface 105, to polarize light emerging from the back light unit 220.

The liquid crystal layer 104 is constituted by a plurality of liquid crystal molecules. The alignment of the liquid crystal molecules may be varied by a drive signal supplied through each transistor 103. Light supplied from the backlight unit 220 may be incident upon the color filter 102 in accordance with variation in the molecular alignment of the liquid crystal layer 104.

Then, at least R, G, or B light is rendered by the color filter 102, to display an image on the front substrate 101 of the LCD panel 230.

Referring to FIG. 3, the pixels of the LCD panel 230 are arranged at respective intersections of data lines 300 and gate lines 310. The transistors 103 of the pixels, namely, TFTs, are connected to respective intersections. Each TFT 103 supplies a data voltage supplied through the corresponding data line 300 to a pixel electrode 320 of a corresponding liquid crystal cell Clc in response to a gate pulse from the corresponding gate line 310.

The liquid crystal cell Clc rotates by an electric field generated due to a difference between the data voltage applied to the pixel electrode 320 and a common voltage Vcom applied to a common electrode 330, thereby adjusting the amount of light passing through the polarization plate. A storage capacitor Cst is connected to the pixel electrode 320 of the liquid crystal cell Clc, to maintain the voltage of the liquid crystal cell Clc.

The above-described structure and configuration of the LCD panel 230 are only illustrative and, as such, there may be other embodiments thereof through addition, insertion, or deletion of constituent elements without departing from the scope of the present invention.

Figure 4:
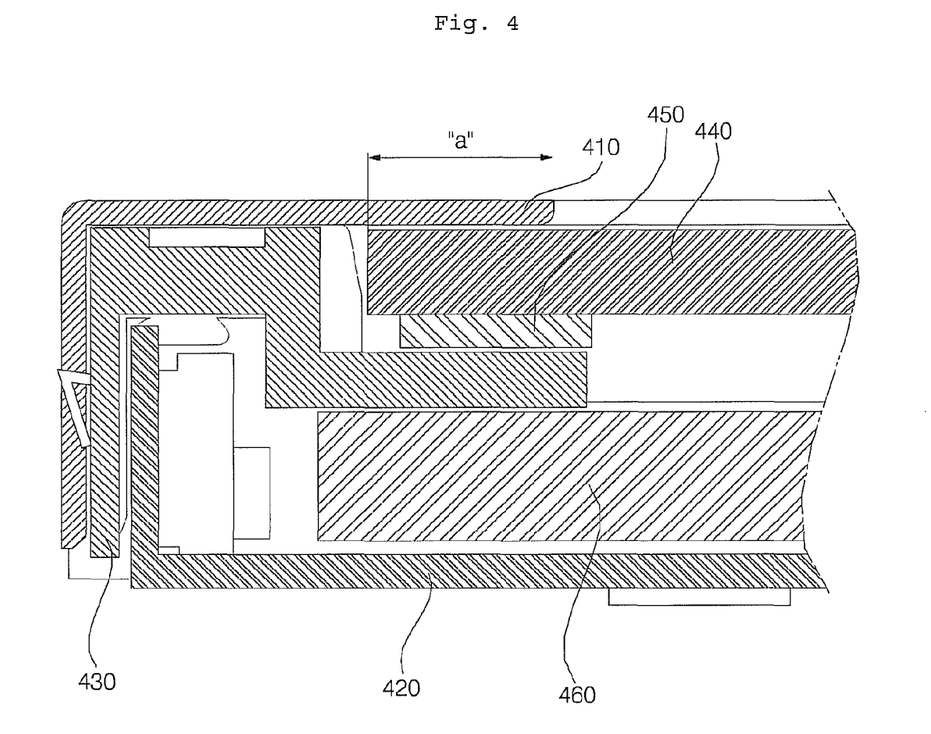
FIGS. 4 and 5 are views for explaining an example of the configuration of the display apparatus.
Figure 5:
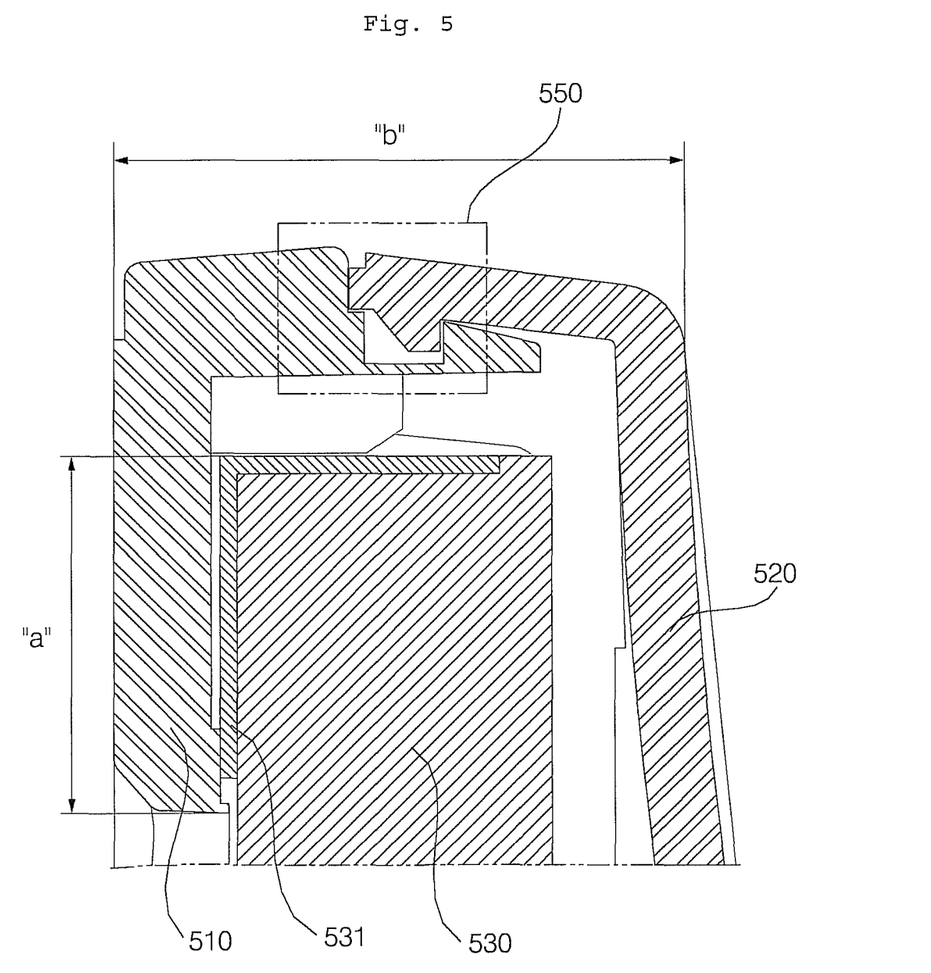

FIGS. 4 and 5 are views for explaining an example of the configuration of the display apparatus.

FIG. 4 is a sectional view of the LCD module. FIG. 5 is a sectional view of the display apparatus.

Referring to FIG. 4, a case top 410 and a cover bottom 420 may define an appearance of the LCD module. An LCD panel 440, a light guide plate 460, etc. may be received in a space defined between the case top 410 and the cover bottom 420.

The case top 410 and guide panel 430 are coupled by latches. The case top 410 has a structure enclosing the LCD panel 440, to prevent the LCD panel 440 from moving forward or rearward.

A cushion pad 450 may be additionally provided to absorb impact applied to the guide panel 430 and LCD panel 440.

Meanwhile, it is necessary to provide an overlap region a between the case top 410 and the LCD panel 440 in order to prevent the LCD panel 440 from being separated.

However, the overlap region a between the case top 410 and the LCD panel 440 may cause a difficulty in reducing a bezel of the display apparatus.

Referring to FIG. 5, the appearance of the display apparatus is defined by a front cover 510 and a back cover 520, which are in a coupled state. An LCD module 530 may be received in a space defined between the front cover 510 and the back cover 520.

The front cover 510 and back cover 520 are coupled in a coupling region 550 by, for example, a latch groove formed at the front cover 510 and a latch formed at the back cover 520.

Meanwhile, a case top 531 is provided at the LCD module 530. For this reason, there is a limitation in reducing the dimensions of an overlap region a between the case top 531 and the LCD panel.

Also, the display apparatus has a set depth b exceeding a predetermined depth due to the base thickness of the plastic or metal material used in the display apparatus.

For example, the display apparatus may have a greater thickness than the thickness of the LCD module by at least 5.0 mm.

Meanwhile, the front cover 510 and back cover 520 are not coupled to the LCD module 530 when they are assembled.

When a display apparatus set is manufactured through addition of other constituent elements to the LCD module, there may be constituent elements, which are separately prepared in spite of similar functions thereof due to different designs made by a module maker and a set maker. For this reason, there may be an increase in material costs and an increase in the number of processes.

For example, the front cover 510, which defines an appearance of the display apparatus and protects the module and other elements received therein, may have a similar function to that of the case top 531, which protects the panel while reinforcing the module.

To this end, the present invention provides a design architecture and a manufacturing system, which can achieve convenience and simplification of manufacturing processes and a reduction in material costs, through proposal of a unique structure capable of unifying elements having a duplicate function.

FIGS. 6 to 11 are views for concretely explaining various configurations of a display apparatus according to the present invention.

Figure 6:
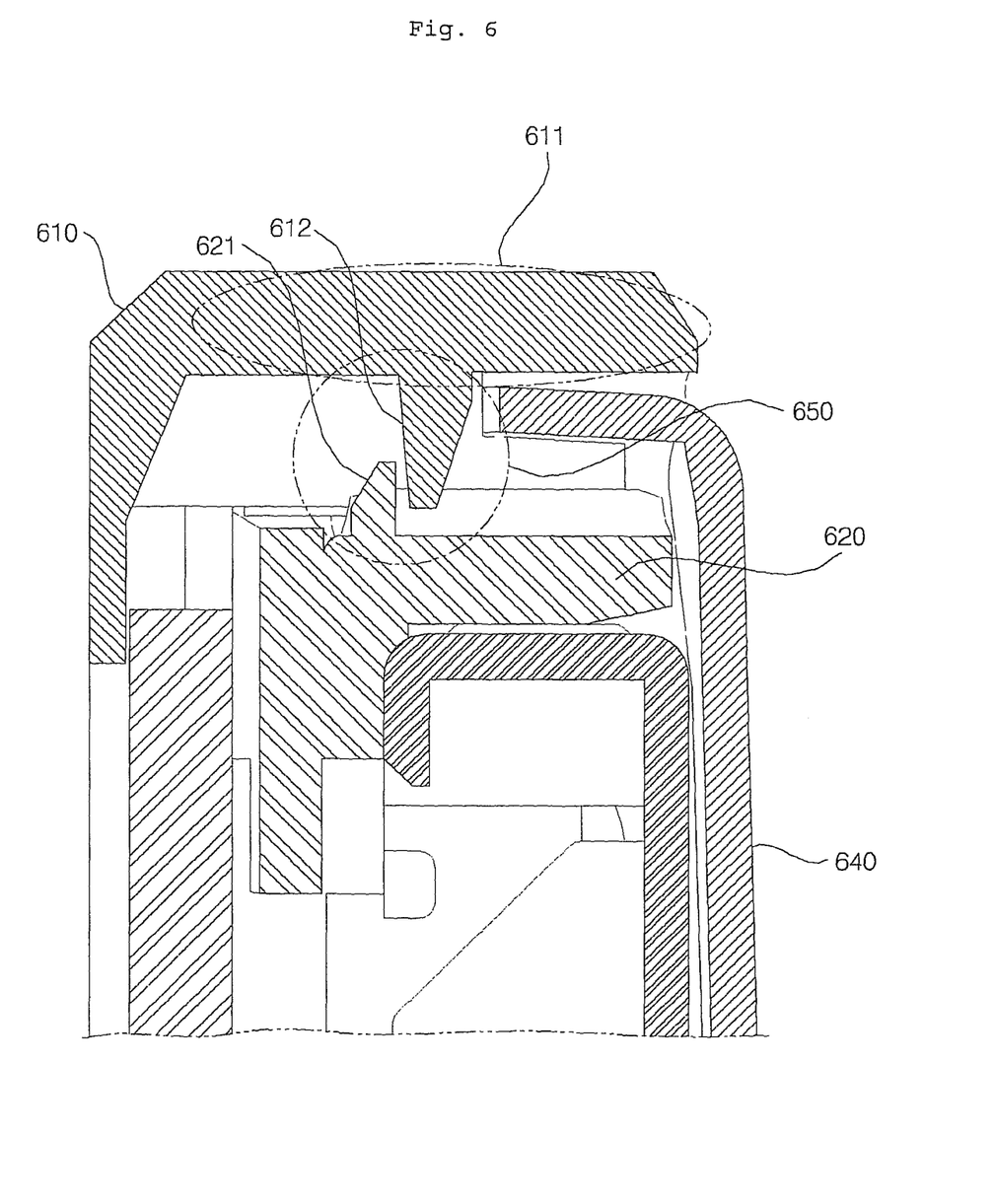
FIGS. 6 to 11 are views for concretely explaining various configurations of a display apparatus according to the present invention.

Referring to FIG. 6, a display apparatus according to an embodiment of the present invention is illustrated. The illustrated display apparatus includes an LCD panel 630, a front cover 610 forming a front outer periphery of the LCD panel 630, and a guide panel 620, on which the LCD panel 630 is seated. The guide panel 620 is coupled to the front cover 610. The display apparatus also includes a back cover 640 coupled to the front cover 610.

As described above, the front cover 610 is coupled with both the guide panel 620 and the back cover 640 and, as such, they define the overall appearance of the display apparatus. These elements also reinforce the display apparatus while preventing movement of the LCD panel 630.

Meanwhile, the front cover 610 may include a bent portion 611, which is bent toward the back cover 640, and a plurality of protrusions 612, which is protruded from the bent portion 611. At least a part of the protrusions 612 may be coupled to the guide panel 620.

Also, the guide panel 620 may include protrusions 621. As shown in a coupling region 650 in FIG. 6, the protrusions 612 of the front cover 610 and the protrusions 621 of the guide panel 620 may be coupled.

In accordance with an embodiment, each protrusion 612 of the front cover 610 and each protrusion 621 of the guide panel 620 may have a latch structure.

In this case, the front cover 610 may realize the function of the case top of the LCD module, to prevent separation of the LCD module, through the latch structure of the front cover 610 and the latch structure of the guide panel 620.

Meanwhile, at least a part of the protrusions 612 of the front cover 610 may be coupled to the back cover 640.

In this case, the back cover 640 may include an opening to be coupled with the protrusions 612.

Alternatively, the back cover 640 may include an engagement member including an opening to be coupled with the protrusions 612. The engagement member may be detachably attached to the back cover 640. By virtue of detachable attachment of the engagement member to the back cover, it may be possible to achieve easier assembly.

Figure 7:
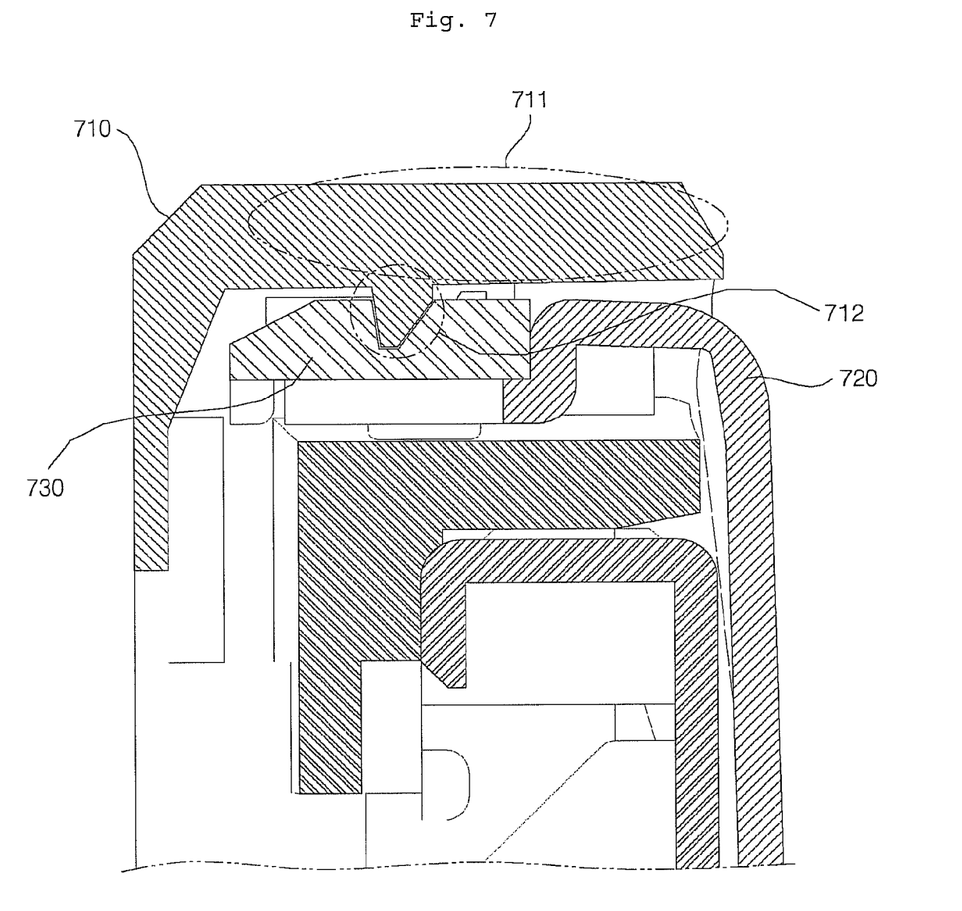
Figure 8:
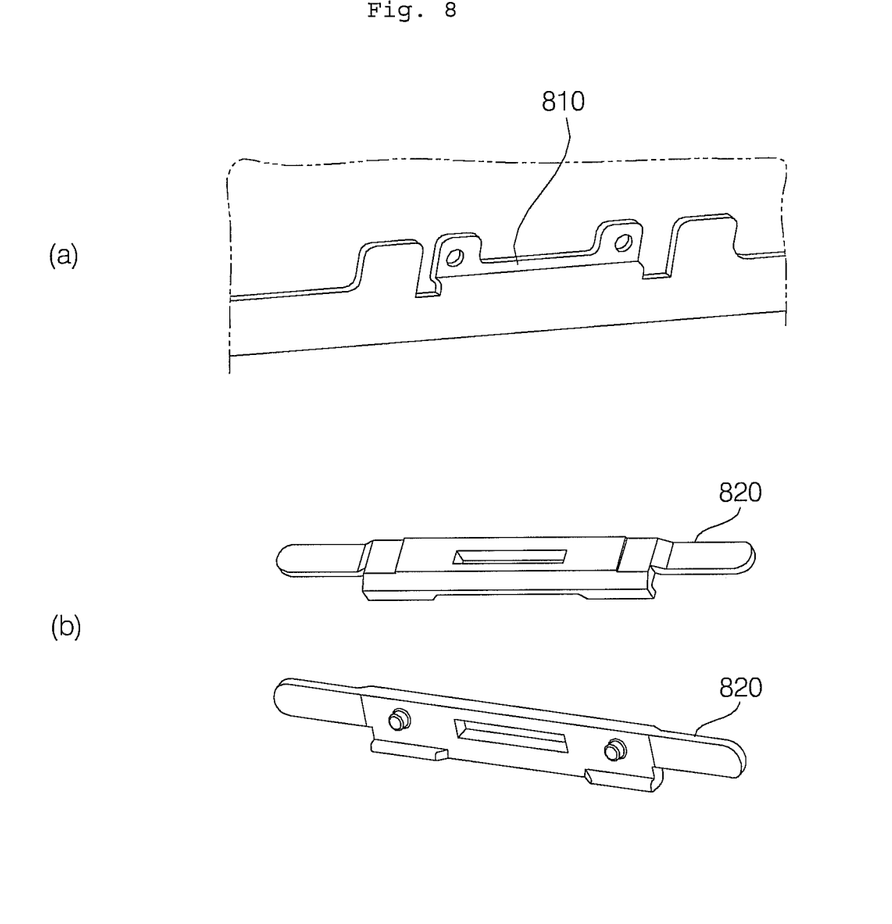
Figure 9:
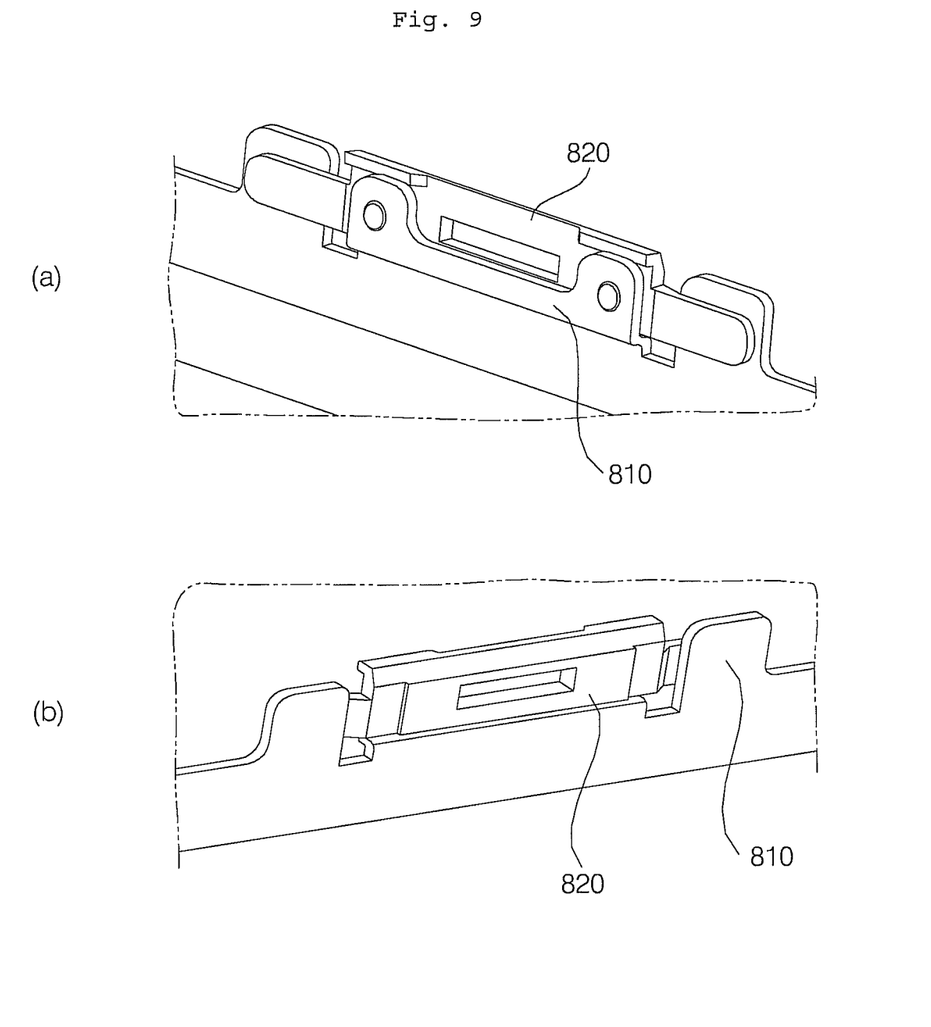

FIGS. 7 to 9 illustrate various examples of the coupling structures of the front cover and back cover, and the engagement member.

Referring to FIGS. 7 to 9, an engagement member 730 may be mounted to a back cover 720.

The engagement member 730 may be used to prevent deformation or damage of the back cover 720 during assembly and disassembly of the display apparatus set. In this case, the engagement member 730 may be made of a plastic material.

Meanwhile, the engagement member 730 may have various shapes.

For example, the engagement member 730 may include a groove corresponding to a latch 712 protruded from a bent portion 711 of a front cover 710, as shown in FIG. 7.

Alternatively, the engagement member 730 may include an opening having the form of a hole such that the latch 712 of the front cover 710 engages with the opening after passing through the opening.

Otherwise, the engagement member 730 may have a hook shape such that it engages with the latch 712 of the front cover 710, to assemble the front cover 710 and back cover 720.

Meanwhile, as shown in FIGS. 8 and 9, the back cover may include a fitting member 810. An engagement member 820 is fitted in the fitting member 810, for mounting thereof.

The front cover according to the present invention also functions as a case top of the LCD module. Accordingly, a narrow bezel and slimness of the display apparatus can be realized.

Also, there is a limitation in reducing a bezel, using front and back covers made of a plastic material because the plastic material requires a certain base thickness for shape integrity. When a back cover made of metal is used to achieve a reduction in bezel, the coupling structure of the front cover may be damaged during an assembly/disassembly process due to the rigidity of the metal.

In accordance with the present invention, however, the back cover, which is coupled with the front cover, includes a plastic piece applied to the coupling portion of the back cover to be coupled with the front cover. Accordingly, it is possible to achieve assembly/disassembly of the front and back covers without damage of the coupling portion.

As described above, the front cover according to the present invention may include a plurality of latches.

Thus, in accordance with an embodiment of the present invention, the display apparatus may include an LCD panel, a front cover including a first latch and a second latch, a guide panel, on which the LCD panel is seated and which is coupled with the first latch, and a back cover coupled with the second latch.

In this case, the front cover may include a bent portion, which is bent toward the back cover. The first latch and second latch may be protruded from the bent portion.

Figure 10:
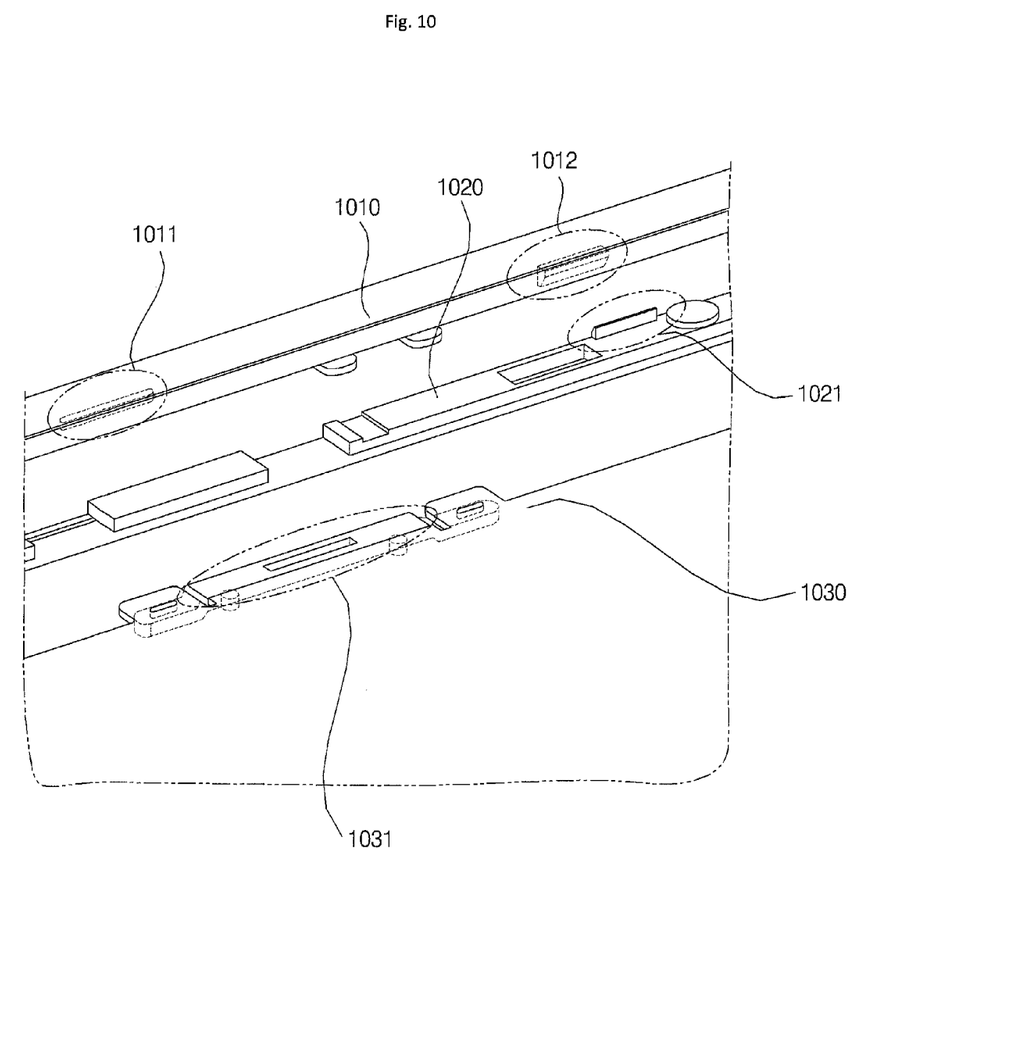

FIG. 10 is a view for concretely explaining a configuration of the display apparatus according to the present invention.

Referring to FIG. 10, the front cover 1010 may include first latches 1011 and second latches 1012. The first latches 1011 and second latches 1012 may be alternately arranged.

The second latches 1012 may be coupled with the guide panel 1020. In accordance with an embodiment, the guide panel 1020 may include third latches 1021. The third latches 1021 may be coupled with respective second latches 1012.

Through the second latches 1012, the front cover 1010 realizes the function of a case top, to prevent separation of the LCD module.

Meanwhile, the first latches 1011 of the front cover 1010 may be coupled with the back cover 1030.

In accordance with an embodiment, the back cover 1030 may include an opening to be engaged with the first latches 1011.

Alternatively, as described above, the back cover 1030 may include detachable engagement members 1031. In this case, the back cover 1030 may also include fitting portions, in which respective engagement members 1031 are fitted.

In accordance with application of the engagement members 1031, each of which is a separate piece, it is possible to prevent deformation and damage of the back cover 1030 during assembly and disassembly of the display apparatus set. In this case, the engagement members 1031 may be made of a plastic material.

Meanwhile, each engagement member 1031 may have a portion having the form of a hook, a hole, or the like. The engagement members 1031 may engage with respective first latches 1011. Through engagement of the first latches 1011 and engagement members 1031, the front cover 1010 and back cover 130 can be assembled.

On the other hand, in accordance with the shapes of the coupling portions of the back cover 1030 and guide panel 102, the first latches 1011 and second latches 1012 may have different shapes such that they can be appropriately engaged, as shown in FIG. 10.

Alternatively, the latches 1011 and 1012 may have different shapes such that they have different engagement directions. In this case, the latches 1011 and 1012 may have different engagement structures. As a result, coupling forces respectively applied to the latches 1011 and 1012 are dispersed in different directions. For example, the coupling forces exert an inward tension and an outward tension, respectively. Thus, more stable coupling is achieved.

Figure 11:
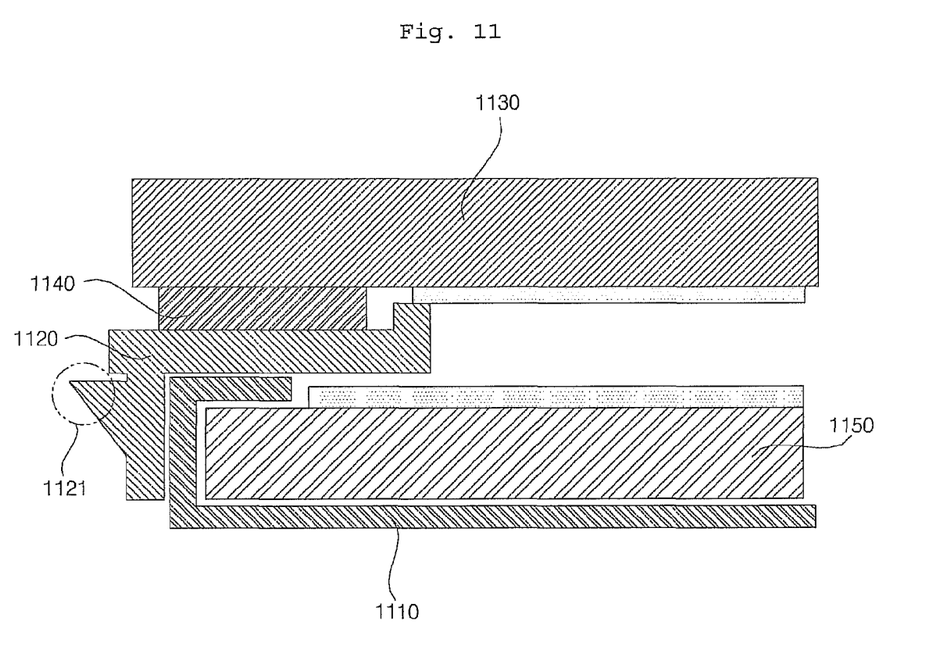

Referring to FIG. 11, a guide panel 1120 is illustrated. The guide panel 1120 may receive a cover bottom 1110 and optical elements, for example, a light guide plate 1150. The guide panel 1120 may include protrusions 1121 to be coupled with the front cover.

Meanwhile, a double-sided tape 1140 may be applied between the guide panel 1120 and an LCD panel 1130, to prevent separation of the LCD panel 1130.

In accordance with the present invention, it is possible to achieve a reduction in bezel and slimness through substitution of the front cover for the case top of the LCD display module.

Meanwhile, when a back cover made of metal is used, it is possible to effectively realize slimness of the display apparatus.

In this case, when the front cover and back cover are disassembled due to assembly error generated in the manufacture or repair process, there may be damage of hooks of the front cover or deformation of the back cover due to the rigidity of the metal.

Such damage generated in the manufacturing process may cause decrease in yield by 30% or more. In this regard, there may also be adverse affects in terms of material costs.

In accordance with the present invention, however, it is possible to achieve assembly and disassembly without damage during repair performed due to manufacturing errors or during after-service because a detachable engagement member made of a plastic material is applied to a portion of the back cover to be coupled with the latch of the front cover.

Thus, in accordance with the present invention, it is possible to simplify the support structure of the display apparatus and to reduce the bezel width, size and weight of the display apparatus. Also, it is possible not only to obtain an enhanced appearance, but also to achieve enhancements in productivity and service quality.

The display apparatus of the present invention is not limited to the configurations and methods of the above-described embodiments. These embodiments may be completely or partially selectively combined to implement various changes.

Meanwhile, it will be understood that when a constituent element is referred to as being "connected" or "coupled" to another constituent element, it can be directly connected or coupled to the other constituent element or intervening elements may also be present.

Also, it will be understood that when a constituent element is referred to as being "directly connected" or "directly coupled to another constituent element, no intervening element may be present.

As apparent from the above description, the display apparatus according to the present invention has an enhanced appearance through a reduced thickness and a reduced bezel. Also, the display apparatus according to the present invention achieves an improvement in manufacturing process and a reduction in manufacturing costs.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A display apparatus comprising:
    a liquid crystal display (LCD) panel;
    a front cover including a first latch and a second latch;
    a back cover coupled with the first latch; and
    a guide panel, on which the LCD panel is provided, the guide panel being coupled to the second latch, and
    wherein the first latch and the second latch have different shapes, and
    wherein the first latch and the second latch are alternately arranged.

2. The display apparatus according to claim 1, wherein the guide panel includes a third latch respectively coupled to the second latch.

3. The display apparatus according to claim 1, wherein the back cover includes an opening coupled to the first latch.

4. The display apparatus according to claim 1, wherein the back cover includes an engagement member having an opening coupled to the first latch.

5. The display apparatus according to claim 4, wherein the engagement member is detachable.

6. The display apparatus according to claim 4, wherein the back cover includes a fitting portion, in which the engagement member is fitted.

7. The display apparatus according to claim 4, wherein the engagement member is made of a plastic material.

8. The display apparatus according to claim 1, wherein the front cover includes a bent portion, which is bent toward the back cover, and the first latch and the second latch protrude from the bent portion.

9. A display apparatus comprising:
a liquid crystal display (LCD) panel;
a first cover having a first latch and a second latch, wherein a shape of the first latch is different than a shape of the second latch, and wherein the first latch and the second latch are alternately arranged;
a second cover having an opening to couple to the first latch; and
a guide panel to support the LCD panel, the guide panel to couple to the second latch.

10. The display apparatus according to claim 9, wherein the guide panel includes a third latch to couple to the second latch.

11. The display apparatus according to claim 9, wherein the second cover includes an engagement member having the opening to couple to the first latch.

12. The display apparatus according to claim 11, wherein the engagement member is detachable.

13. The display apparatus according to claim 11, wherein the second cover includes a fitting portion to receive the engagement member.

14. The display apparatus according to claim 11, wherein the engagement member is a plastic material.

15. The display apparatus according to claim 9, wherein the first cover includes a bent portion that is bent toward the second cover, and the first latch and the second latch to protrude from the bent portion.

* * * * *